United States Patent [19]

Fujii et al.

[11] Patent Number: 5,009,907
[45] Date of Patent: Apr. 23, 1991

[54] METHOD FOR TREATING FOOD TO CONTROL THE GROWTH OF YEASTS

[75] Inventors: Masahiro Fujii, Tokyo; Masakazu Hatakeyama, Minamatashi; Jun Hiraki, Yokohamashi, all of Japan

[73] Assignee: Chisso Corporation, Japan

[21] Appl. No.: 371,008

[22] Filed: Jun. 26, 1989

[30] Foreign Application Priority Data

Jul. 7, 1988 [JP] Japan ................................ 63-169233

[51] Int. Cl.$^5$ ........................................... A23L 3/3463
[52] U.S. Cl. ................................... 426/335; 426/532; 426/654; 426/656
[58] Field of Search ............... 426/654, 656, 532, 335

[56] References Cited

U.S. PATENT DOCUMENTS

| 3,996,386 | 12/1976 | Malkki et al. | 426/321 |
| 4,378,803 | 4/1983 | Takagi et al. | 604/280 |
| 4,446,161 | 5/1984 | Friedman et al. | 426/335 |
| 4,820,442 | 4/1989 | Motoyama et al. | 252/188.28 |
| 4,820,520 | 4/1989 | Yokotsuka et al. | 424/439 |

FOREIGN PATENT DOCUMENTS

| 57-43668 | 3/1982 | Japan . |
| 62-58975 | 3/1987 | Japan . |
| 63-22171 | 1/1988 | Japan . |
| 2212810 | 8/1989 | United Kingdom . |

Primary Examiner—Donald E. Czaja
Assistant Examiner—Evan Federman
Attorney, Agent, or Firm—Leydig, Voit & Mayer

[57] ABSTRACT

Ethanol preparations exhibiting a superior effect upon food preservation and also a superior antiseptic effect upon yeasts are provided, which preparations comprise a polylysine or a polylysine salt added to anhydrous ethanol or a water-containing ethanol in an ethanol concentration of 30% by weight or higher.

12 Claims, No Drawings

METHOD FOR TREATING FOOD TO CONTROL THE GROWTH OF YEASTS

BACKGROUND OF THE INVENTION

1. Field of the Invention

This invention relates to ethanol preparations for food preservation, which exhibit a superior effect upon food preservation. More particularly it relates to ethanol preparations for food preservation, characterized by having a polylysine added to anhydrous ethanol or a water-containing ethanol in an ethanol concentration of 30% by weight or higher, or by having a polylysine salt added to a water-containing ethanol in an ethanol concentration of 30% by weight or higher.

2. Description of the Related Art

It has been experientially known from old times that ethanol inhibits growth of microorganisms, and ethanol has been widely used for hygienic control of food factories or as a countermeasure to food preservation.

Further, there have been used ethanol preparations for food preservation having added to ethanol, an agent for improving food preservation, for example natural or synthetic food additives such as organic acids e.g. fumaric acid, malic acid, citric acid, etc., sodium salts of these acids, sodium chloride, calcium oxide, glycine, lower fatty acid esters e.g. glycerine fatty acid esters, sorbitan fatty acid esters, etc.

However, such ethanol preparations for food preservation having the above-mentioned agent for improving food preservation added to ethanol have a drawback that they are inferior in the antiseptic effect upon yeasts; thus it is the present status that ethanol preparations for food preservation also having a superior antiseptic effect upon yeasts have been desired to be developed.

The present inventors have made extensive research in order to develop ethanol preparations for food preservation having a superior antiseptic effect not only upon various bacteria and molds but also upon yeasts. As a result, we have found that ethanol preparations having a polylysine added to anhydrous ethanol or a water-containing ethanol in an ethanol concentration of 30% by weight or higher or ethanol preparations having, a polylysine salt added to a water-containing ethanol in an ethanol concentration of 30% by weight or higher have a superior antiseptic effect not only upon various bacteria and molds, but also upon yeasts, and have achieved the present invention based upon the above finding.

SUMMARY OF THE INVENTION

As apparent from the foregoing, the object of the present invention is to provide ethanol preparations for food preservation having a superior antiseptic effect not only upon various bacteria and molds, but also upon yeasts.

The present invention has the following constitutions:

(b 1) ethanol preparations for food preservation comprising a polylysine added to anhydrous ethanol or a water-containing (aqueous) ethanol solution having an ethanol concentration of 30% by weight or higher; and (2) ethanol preparations for food preservation comprising a polylysine salt added to a water-containing or aqueous solution of ethanol having an ethanol concentration of 30% by weight or higher.

DETAILED DESCRIPTION OF PREFERRED EMBODIMENTS

The ethanol concentration of the water-containing or aqueous ethanol is 30% by weight or higher, preferably 30 to 90% by weight, more preferably 45 to 75% by weight. If a water-containing ethanol in an ethanol concentration lower than 30% by weight is used, it is necessary to achieve the preservation effect to add a large quantity of the ethanol preparations, and since the water content in foods having the ethanol preparations added therein increases, this has a disadvantageous effect upon food preservation.

When a water-containing ethanol in an ethanol concentration around 75% by weight is used, the sterilizability of ethanol itself becomes maximum; hence in the present invention, it is most preferred to use the water-containing ethanol in an ethanol concentration around 75% by weight.

The polylysine used in the present invention may be obtained for example according to a preparation disclosed in Japanese patent publication No. Sho 59-20359/1984. Namely, *Streptomyces albulus* subspecies lysinopolymerus belonging to Streptomyces genus and being a polylysine-producing microorganism is cultured in a medium, followed by separating produced $\epsilon$-polylysine from the resulting medium and collecting it. Polylysines include $\alpha$-polylysine obtained by condensation of an amino group at $\alpha$-position with carboxyl group and $\epsilon$-polylysine obtained by condensation of an amino group at $\epsilon$-position with carboxyl group. In the present invention, either of $\alpha$-polylysine or $\epsilon$-polylysine may be used, but it is preferred to use $\epsilon$-polylysine.

In the present invention, the polylysines may be used in free form, but they may also be used in the form of a salt of inorganic acids such as hydrochloric acid, sulfuric acid, phosphoric acid, etc. or organic acids such as acetic acid, propionic acid, fumaric acid, malic acid, citric acid, etc.

Whether the polylysines are in free form or in the form of a salt of inorganic acids or organic acids, there is no substantial difference therebetween in the effect thereof as an agent for food preservation, but the polylysine in free form is superior to that in salt form in the aspect of solubility in anhydrous ethanol or water-containing ethanol.

The proportion of the polylysines or polylysine salts added has no particular limitation, but it is preferably 0.01 to 30% by weight based on the weight of the ethanol preparations. In particular, when the resulting ethanol preparations are used in a manner of spraying or coating them onto foods or apparatus or instruments for producing food products, the proportion of the polylysines or their salts added may be 0.01 to 1% by weight, and when they are used in a manner of adding them to foods, the proportion may be 0.01 to 30% by weight. However, the proportion is preferred to be adequately varied depending on the conditions of desired shelf life (days), water activity, salt content, etc. of foods.

In the ethanol preparations of the present invention, it is possible for the enhancement of food preservation to simultaneously use organic acids such as malic acid, citric acid, fumaric acid, etc., sodium salts of these acids, lower fatty acid monoglycerides, sodium acetate, etc. with the polylysines or their salts. The proportion of the above organic acids, sodium salts thereof, lower fatty acid monoglycerides, sodium acetate, etc. added is 0.01 to 5% by weight based on the weight of the ethanol preparations. Besides these materials, various known components conventionally used as an agent for food preservation such as amino acids e.g. glycine may also be simultaneously used.

The ethanol preparations of the present invention may also be prepared by dissolving polylysines or salts thereof in anhydrous ethanol or a water-containing ethanol in an ethanol concentration of 30% by weight or higher.

The ethanol preparations of the present invention are used in the form of being added to or sprayed onto livestock products such as ham, sausage, etc., aquatic paste products such as "chikuwa" (a Japanese term: a hollow baked fish-paste), "kamaboko" (a Japanese term: a boiled fish paste), etc., wheat flour products such as confectionary, noodle-like foods, etc., and besides, the preparations may also be used for sterilizing tablewares, apparatus for food production, human hands or fingers, etc.

The present invention will be described in more detail by way of examples and comparative examples, but it should not be construed to be limited thereto.

EXAMPLE 1 AND COMPARATIVE EXAMPLE 1

$\epsilon$-Polylysine was dissolved in an aqueous ethanol solution having concentration of 55% by weight to prepare ethanol preparations in a polylysine concentration of 5% by weight.

The above ethanol preparations (2 g) were added to a whipped cream (98 g) prepared in clean facilities and these were uniformly mixed to prepare a sample.

Further, as Comparative example 1, an aqueous ethanol solution having concentration of 55% by weight was added to the whipped cream (98 g) and these were uniformly mixed to prepare a comparative sample.

Further, the whipped cream (100 g) having neither ethanol preparations nor water-containing ethanol added was made a control sample.

The above sample, comparative sample and control sample were placed in a constant temperature bath at 30° C. and preserved therein and the number of microorganisms was measured with lapse of time. The number of general bacteria was measured according to a pour plate culture method using a standard agar medium (37° C., 2 days) and the number of yeasts was measured according to a pour plate culture method using a potato dextrose agar medium (25° C., 2 days). The results are shown in Table 1.

As apparent from Table 1, the ethanol preparations of the present invention are observed to exhibit a notable effect of growth inhibition not only upon general bacteria but also upon yeasts

EXAMPLE 2 AND COMPARATIVE EXAMPLE 2

With a commercially available salad, comparison tests of its preservation properties were carried out according to the following method:

① Separation of strains to be tested:

Two kinds of bacteria and a kind of yeast were separated from a commercially available salad in a conventional manner.

② Preparation of microbial solutions:

With the bacteria and yeast separated from the commercially available salad, the bacteria were cultured in a conventional slant agar medium at 37° C. for one day and the yeast was cultured in a slant YM agar medium at 25° C. for 2 days. The cultured microbes were floated on a sterilized physiological saline and adjusted so as to give a concentration of microbial number of $10^3$ strains/ml to prepare a single microbial solutions. The respective single microbial solutions were mixed each in an equal quantity to prepare mixed microbial solutions.

③ Preparation of ethanol preparations:

$\epsilon$-Polylysine was dissolved in a water-containing ethanol in an ethanol concentration of 75% by weight to prepare ethanol preparations containing $\epsilon$-polylysine in a concentration of 5% by weight.

In the test of Comparative example 2, a water-containing ethanol in an ethanol concentration of 75% by weight was used as it was.

④ Operational method of the test:

A commercially available salad was sterilized by high-pressure steam. To the sterilized salad (98 g) were added the above-mentioned ethanol preparations (2 g) in Example 2, while to the salad was a water-containing ethanol in a concentration of 75% by weight (2 g) in Comparative example 2, followed by uniformly mixing these. After the mixing, the respective mixed microbial solutions prepared in the above item ② were added in a quantity of 0.2 mg per g of the salad, to effect inoculation, followed by uniformly mixing these to prepare samples.

The respective mixed microbial solutions, alone were added to the sterilized salad (98 g) in the same quantity as in Example 2 and Comparative example 2, to effect inoculation, followed by uniformly mixing these to prepare control sample.

The respective samples were placed in a constant temperature bath at 20° C. and preserved to measure the number of microorganisms with lapse of time.

The number of general bacteria was measured according to pour plate culture method using a standard agar medium (37° C., 2 days) and the number of yeasts was measured according to pour plate culture method using a potato dextrose agar medium having Chloromy-

TABLE 1

| Elapse time (day) | Example 1 | | Comparative example 1 | | Control example | |
|---|---|---|---|---|---|---|
| | Number of general bacteria | Number of yeasts | Number of general bacteria | Number of yeasts | Number of general bacteria | Number of yeasts |
| 0 | 10 or less | 10 or less | 10 or less | 10 or less | 10 or less | 10 or less |
| 1 | 10 or less | 10 or less | $8 \times 10^1$ | $3 \times 10^2$ | $4 \times 10^2$ | $8 \times 10^2$ |
| 3 | $3 \times 10^4$ | 10 or less | $2 \times 10^6$ | $6 \times 10^4$ | $5 \times 10^7$ | $8 \times 10^5$ |
| 5 | $1 \times 10^6$ | 10 or less | $9 \times 10^7$ | $5 \times 10^6$ | $1 \times 10^9$ | $3 \times 10^7$ | cetin (trade name of chloramphenicol) (100 ppm) added (25° C., 2 days).

The results are shown in Table 2. The number of microorganisms in Table 2 refers to the number of microorganisms in 1 g of sample.

As apparent from Table 2, the ethanol preparations of the present invention are observed to exhibit a superior effect of food preservation not only upon general bacteria but also upon yeasts.

TABLE 2

| Elapse time (day) | Example 2 | | Compar. example 2 | | Control example | |
|---|---|---|---|---|---|---|
| | Number of general bacteria | Number of yeasts | Number of general bacteria | Number of yeasts | Number of general bacteria | Number of yeasts |
| 1 | $6 \times 10^3$ | 10 or less | $5 \times 10^4$ | $2 \times 10^4$ | $5 \times 10^6$ | $4 \times 10^4$ |
| 2 | $8 \times 10^5$ | $1 \times 10^2$ | $7 \times 10^6$ | $6 \times 10^5$ | $1 \times 10^9$ | $3 \times 10^6$ |
| 3 | $7 \times 10^6$ | $7 \times 10^2$ | $9 \times 10^7$ | $2 \times 10^6$ | — | $9 \times 10^6$ |
| 4 | $2 \times 10^7$ | $3 \times 10^4$ | — | — | — | — |

EXAMPLES 3 AND 4 AND COMPARATIVE EXAMPLES 3 AND 4

ε-Polylysine hydrochloride was dissolved in a water-containing ethanol in an ethanol concentration of 50% by weight to prepare ethanol preparations containing the polylysine in a concentration of 0.5% by weight.

The above ethanol preparations (2% by weight) were added to "kamaboko" having a basic composition obtained by blending a frozen minced fish (1,000 g), NaCl (30 g), "mirin" (a Japanese term: a sweet sake) (20 g), sodium glutamate (10 g), sugar (10 g), potato starch (70 g) and ice water (400 g), followed by further adding malic acid (0.1% by weight) in Example 4, mashing the mixture for 30 minutes, setting the resulting material onto a wood plate and steaming it to obtain "kamaboko" s set onto a wood plate. Further, in Comparative examples 3 and 4, to the basic composition of "kamaboko" as in Examples 3 and 4 was added 2% by weight of a water-containing ethanol in an ethanol concentration of 55% by weight, followed by further adding malic acid (0.1% by weight) in Comparative example 4 to obtain "kamaboko"s set onto a plate in the same manner as in Examples 3 and 4. In a control example, neither ethanol preparations nor water-containing ethanol was added to the basic composition of "kamaboko" as in Examples, but processing was carried out under the same conditions as in Examples 3 and 4 to obtain a "kamaboko" set onto a wood plate.

The respective "kamaboko"s obtained in examples, comparative examples and control example were subjected to simple packaging, followed by preserving them at 20° C. to observe a change in their appearance. As to the observation of a change in their appearance, occurrence of mucus or mold and the extent of deterioration of the preserved samples were observed and evaluated under the following standards:

—: Unchanged
+: Stickiness or mold occurred
++ ~ +++ : Extent of deterioration was notable.

The results are shown in Table 3.

As apparent from table 3, it is possible for the ethanol preparations for food preservation of the present invention to prolong shelf life of "kamaboko" to a large extent, and further, in the results of organoleptic examinations, differences were not observed between the results of examples and those of the comparative examples in all respects of taste, color and smell.

TABLE 3

| Elapse time | Example 3 | Example 4 | Compar. ex. 3 | Compar. ex. 4 | Control |
|---|---|---|---|---|---|
| 1 day | — | — | — | — | — |
| 2 | — | — | — | — | + |
| 3 | — | — | — | — | ++ |
| 4 | — | — | + | — | |
| 5 | — | — | ++ | + | |
| 6 | + | — | | ++ | |
| 7 | ++ | + | | | |
| 8 | | ++ | | | |

EXAMPLE 5 AND COMPARATIVE EXAMPLE 5

ε-Polylysine was dissolved in a water-containing ethanol in an ethanol concentration of 75% by weight to prepare ethanol preparations having an ε-polylysine concentration of 5% by weight, followed by uniformly spraying the preparations onto the surface of 10 just-made fruit cakes and preserving the resulting cakes at 25° C. over one month.

As a comparative example, a water-containing ethanol in an ethanol concentration of 75% by weight was uniformly sprayed onto the surface of 10 just-made fruit cakes, followed by preserving the resulting cakes at 25° C. over one month.

As a control, 10 just-made fruit cakes were preserved at 25° C. over one month as they were.

The percentage of occurrence of molds and yeasts after one month preservation of the fruit cakes was examined. The results are shown in Table 4.

In the present invention where ethanol preparations for food preservation were sprayed, the percentage of occurrence of molds and yeasts was 0%, whereas in Comparative example 5, the preservation effect was inferior

TABLE 4

| | Example 5 | Compar. ex. 5 | Control |
|---|---|---|---|
| Percentage of occurrence of molds and yeasts | 0% | 20% | 100% |

EXAMPLE 6 AND COMPARATIVE EXAMPLES 6 AND 7

ε-Polylysine propionate salt was dissolved in a water-containing ethanol in an ethanol concentration of 55% by weight to prepare ethanol preparations in a polylysine propionate salt concentration of 0.5% by weight. The preparations were added in 2% by weight to a commercially available soup for noodle soups, followed by preserving the resulting material at 25° C. over one week.

In Comparative example 6, glycerine monolaurate was dissolved in a water-containing ethanol in an ethanol concentration of 55% by weight, so as to give a concentration of 0.5% by weight, and in Comparative example 7, glycine was dissolved in a water-containing ethanol in an ethanol concentration of 55% by weight, so as to give a concentration of 0.5% by weight. The respective solutions were added to a soup for noodle soups same as in Example 6, followed by preserving the respective materials at 25° C. over one week.

As a control, a commercially available soup for noodle soups same as in Example 6 was observed at 25° C. over a week.

The occurrence condition of mat-forming yeasts in these soups for noodle soups is shown in Table 5.

As apparent from Table 5, when the ethanol preparations for food preservation obtained in Example 6 were used, the preservation condition was good over a week.

Whereas, the preservation effect in Comparative examples 6 and 7 is seen to be inferior to that in the case where the ethanol preparations for food preservation of the present invention were used.

TABLE 5

|  | Example 6 | Comp. ex. 6 | Comp. ex. 7 | Control |
| --- | --- | --- | --- | --- |
| After 3 days | − | − | − | + |
| After 5 days | − | ± | + | ++ |
| After 7 days | − | + | ++ | +++ |

(Note)
The symbols −, ±, + and ++ indicate that there was no occurrence; the occurrence was slightly observed; the occurrence was observed; and the occurrence was considerably observed, respectively.

The ethanol preparations of the present invention exhibit a superior effect of preserving various foods such as livestock products e.g. ham, sausage, etc., aquatic paste products e.g. "chikuwa", "kamaboko", etc., wheat flour products e.g. confectionary, noodle-like foods, etc., soups for noodle soups, etc., and also exhibit an antiseptic effect upon yeasts; hence the preparations are preferably usable as an agent for preserving various foods.

EXAMPLE 7 AND COMPARATIVE EXAMPLE 8

ε-Polylysine was dissolved in anhydrous ethanol to prepare ethanol preparations having an ε-polylysine concentration of 5% by weight. The ethanol preparations were uniformly sprayed onto the respective surfaces of 10 pieces of commercially available cake called "Baumkuchen" in Japan and the resulting pieces were preserved at 25° C. over one month.

As a Comparative Example (example No. 8), anhydrous ethanol was uniformly sprayed onto the respective surfaces of 10 pieces of commercially available Baumkuchen and the resulting pieces were preserved at 25° C. over one month.

As a control, 10 pieces of commercially available Baumkuhen were preserved at 25° C. over one month, as they were.

The percentages of occurrence of molds and yeasts after one month were examined. The results are shown in Table 6.

When the ethanol preparations for food preservation of the present invention were sprayed, the percentage of occurrence of molds and yeasts was 0%, whereas in Comparative example 8, the preservation effectiveness was inferior.

TABLE 6

|  | Example 7 | Compar. ex. 8 | Control |
| --- | --- | --- | --- |
| Percentage of occurrence of molds and yeasts | 0% | 20% | 100% |

What is claimed is:

1. A method of treating food to control the growth of yeasts comprising adding ethanol preparations to food, wherein the ethanol preparations comprise a solution of ε-polylsine in ethanol having an ethanol concentration of 30% by weight or higher.

2. A method of treating food to control the growth of yeasts according to claim 1, wherein the ethanol preparations comprise a solution of a ε-polylsine salt in aqueous ethanol having an ethanol concentration of 30% by weight or higher.

3. A method of treating food to control the growth of yeasts according to claim 2, wherein said ε-polylysine salt is an inorganic salt.

4. A method of treating food to control and growth of yeasts according to claim 1, wherein the ethanol preparations further comprise at least one member selected from the group consisting of malic acid, citric acid, fumaric acid, sodium salts of the foregoing, lower fatty acid monoglycerides, sodium acetate, and glycine.

5. A method of treating food to control the growth of yeasts according to claim 2, wherein the ethanol preparations further comprise at least one member selected from the group consisting of malic acid, citric acid, fumaric acid, sodium salts of the foregoing, lower fatty acid monoglycerides, sodium acetate, and glycine.

6. A method of treating food to control the growth of yeasts according to claim 1, wherein said ethanol is anhydrous.

7. A method of treating food to control the growth of yeasts according to claim 1, wherein said ethanol is an aqueous solution.

8. A method of treating food to control the growth of yeasts according to claim 6, wherein said ε-polylysine is in the free form.

9. A method of treating food to control the growth of yeasts according to claim 2, wherein said ε-polylysine is in the free form.

10. A method of treating food to control the growth of yeasts according to claim 2, wherein said ε-polylysine is an organic salt.

11. A method of treating food to control the growth of yeasts according to claim 3, wherein said inorganic salt of ε-polylysine is of hydrochloric acid, sulfuric acid, or phosphoric acid.

12. A method of treating food to control the growth of yeasts according to claim 10, wherein said organic salt of ε-polylysine is of acetic acid, propionic acid, fumaric acid, malic acid, or citric acid.

* * * * *